C. G. MILLER.
AUTOMOBILE STREET SWEEPER.
APPLICATION FILED JULY 11, 1916.
1,224,771.
Patented May 1, 1917.
3 SHEETS—SHEET 3.
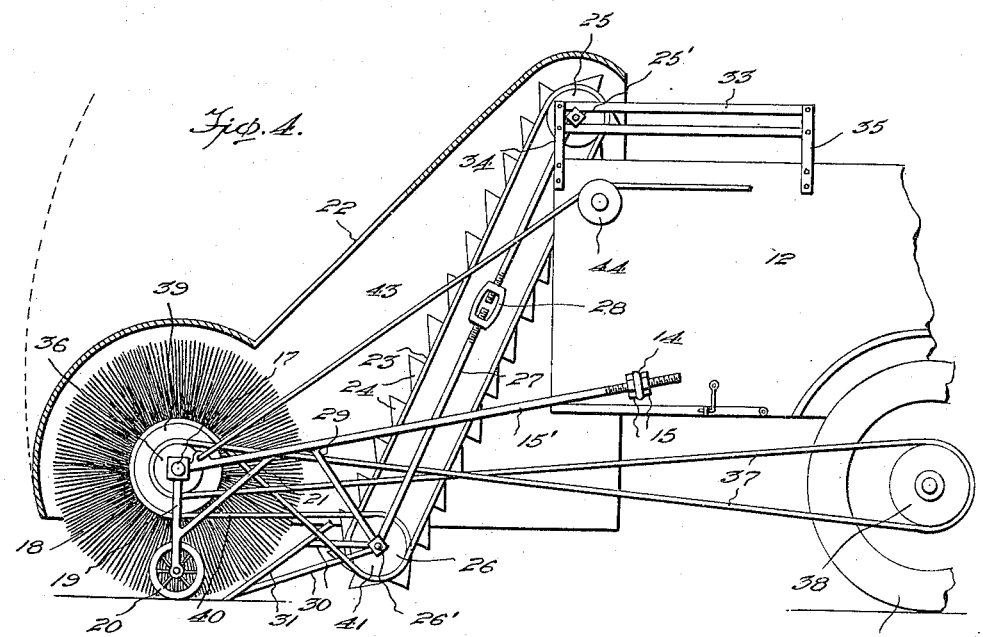
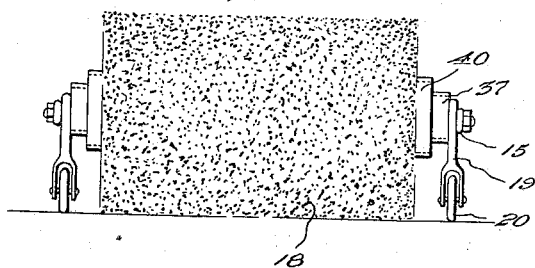
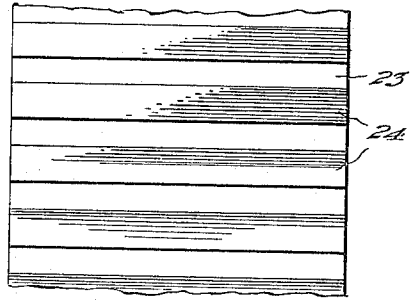
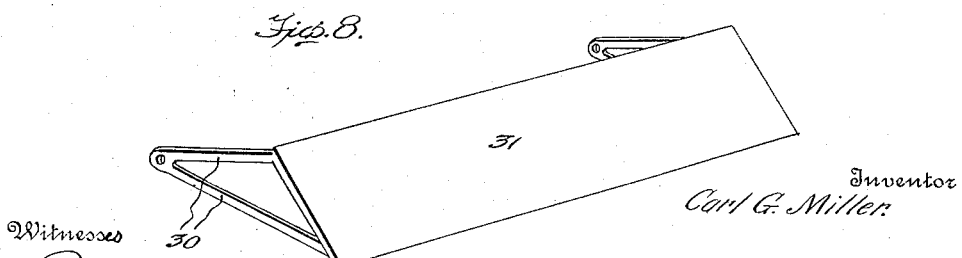
Inventor
Carl G. Miller.
Witnesses
By John Louis Waters & Co.
Attorney

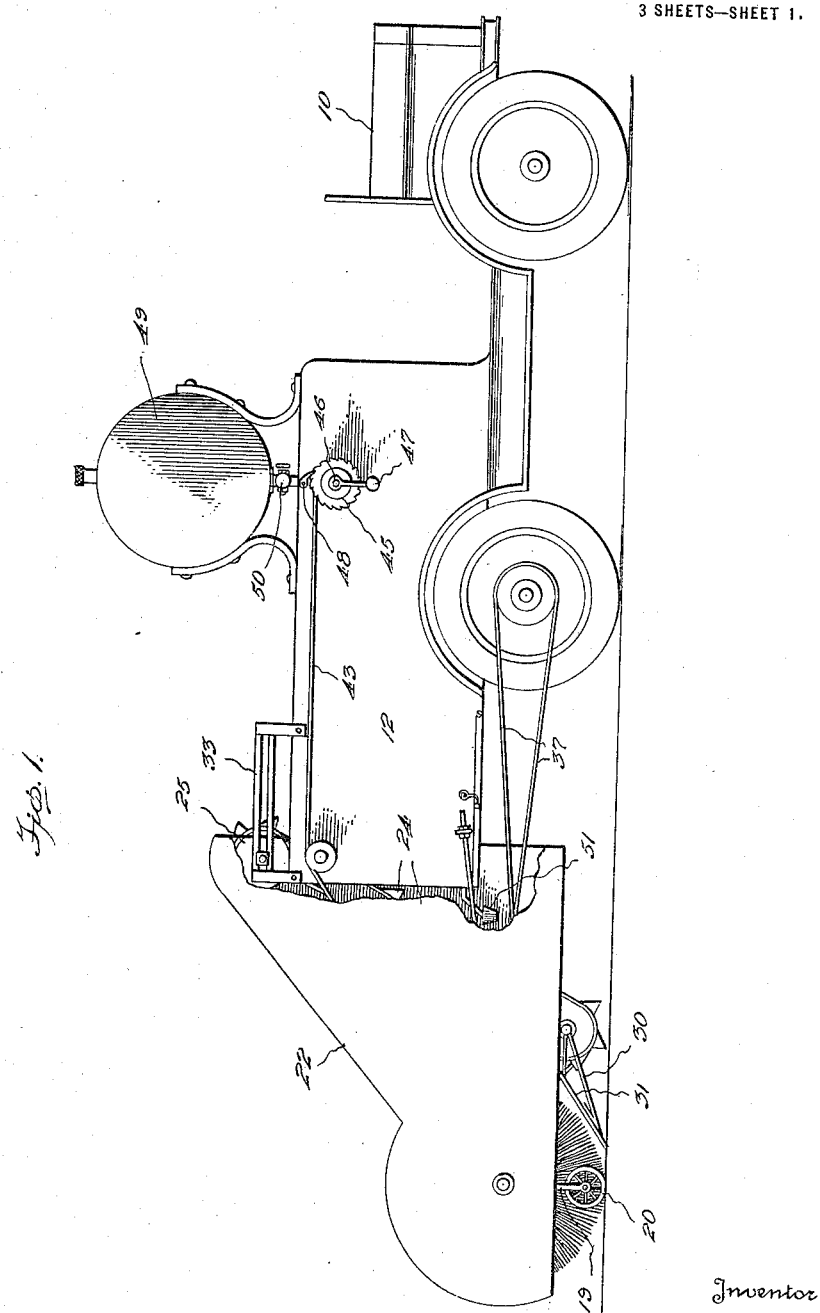

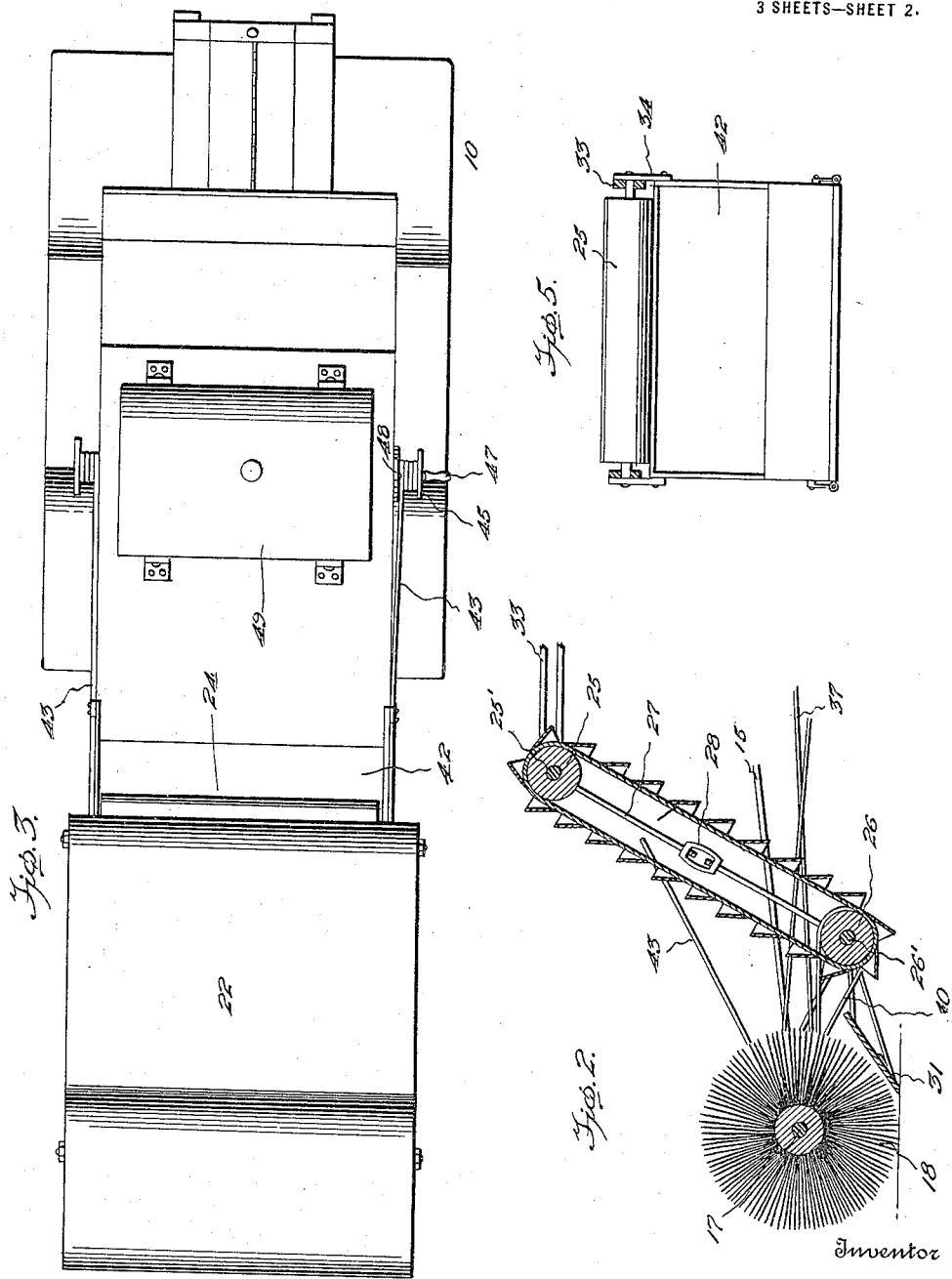

UNITED STATES PATENT OFFICE.

CARL G. MILLER, OF BAY CITY, MICHIGAN.

AUTOMOBILE STREET-SWEEPER.

1,224,771.　　　　Specification of Letters Patent.　　Patented May 1, 1917.

Application filed July 11, 1916. Serial No. 108,683.

*To all whom it may concern:*

Be it known that I, CARL G. MILLER, a citizen of the United States, residing at Bay City, in the county of Bay and State of Michigan, have invented certain useful Improvements in Automobile Street-Sweepers, of which the following is a specification, reference being had therein to the accompanying drawing.

This invention relates to improvements in automobile street sweepers, one object of the invention being the provision of a device of this character in which the sweeping mechanism is carried behind and is driven by the tractor wheels of an automobile so that the dust and dirt from the street may be delivered to a receptacle in the automobile to be carried away for dumping.

A further object of this invention is the provision of a sweeping mechanism swingingly connected to the rear of an automobile and provided with means for limiting the downward movement thereof and means for elevating the same out of contact with the surface traversed.

A still further object of this invention is the provision of a device of this character which will be durable in construction and thoroughly efficient and practical in operation.

In the accompanying drawings:—

Figure 1 is a side elevation of the complete machine.

Fig. 2 is a longitudinal sectional view through the sweeping apparatus of the rear part of such machine.

Fig. 3 is a top plan view of the complete apparatus as shown in Fig. 1.

Fig. 4 is an enlarged detail side elevation of the sweeping mechanism, dotted lines illustrating the arc of the circle it performs when being elevated.

Fig. 5 is a rear end elevation of the vehicle showing the trackways in section;

Fig. 6 is an elevation of the rotary brush and wheeled supports;

Fig. 7 is a fragmentary plan view of the conveyer;

Fig. 8 is a perspective view of the guide shelf.

Similar reference characters indicate corresponding parts throughout the several views of the drawings.

Referring to the drawings, the numeral 10 designates the motor vehicle which is provided with the rear tractor wheels 11 and with the dust and dirt receptacle 12, said receptacle being provided with the hinged trap door 13 so that the dust and dirt collected therein may be discharged when desired.

Connected to opposite sides of the receptacle 12 upon the exterior thereof are the swiveling eyes or rings 14 which receive the threaded ends of the radius rods 15, the nuts 16 being employed to adjust said rods.

Connected to the outer ends of said rods 15 is the shaft 17 of the rotary brush 18, said rods 15 also having connected thereto the depending arms 19 which carry the supporting rubber tire wheels 20, said arms 19 being further braced by the braces 21.

Carried by this frame work is a casing 22 which surrounds the greater portion of the brush 18, and also the endless dust and dirt conveyer 23 which is a canvas belt provided with the metal receptacle forming strips 24 and passed around the upper and lower rollers 25 and 26.

This endless conveyer 23 is held in proper adjusted relation by means of the sectional rod 27 having a turnbuckle 28 and disposed between the respective shafts 25' and 26' of the rollers 25 and 26.

The shaft 26' is connected by the bracing arms 29 to the rods 15, and also supported therefrom are the brackets 30 which carry the dust and dirt guiding shelf 31 so that the dust and dirt raised or elevated by the brush 18 will be directed upon the lower end of the endless conveyer belt 23.

The shaft 25' is mounted in the bearings 22 which in turn are slidably mounted upon the trackways 33 supported by the standards 34 and 35 at the top of the dust and dirt receptacle.

In order that the brush 18 and the conveyer 23 may be operated simultaneously, a pulley 36 is fast to each end or to one end of the shaft 17, and receives motion through the belt 37 from the pulley 38 connected to the tractor wheel 11 of the motor car. Also carried by the shaft 17 is a larger pulley 39 which through the belt 40 operates the pulley 41 of the shaft 26'.

Thus when the brush 18 is operated, the conveyer belt 23 is also operated and dust and dirt carried thereby will be guided over the shelf 31 to the lower end of the conveyer belt 23 which carries the dust and dirt upwardly and dumps it into the opening 42 at the top of the dust compartment.

In order that the present device may be elevated to lift the brush 18 and the wheels 20 above the ground, the two cables 43 are connected to the lower ends of the arms 15 and extend over the guide pulleys 44 to the winding drums 45 connected to the transverse shaft 46 and operated through the crank 47 and the pawl to the ratchet locking and releasing device 48.

In order that water may be sprinkled upon the surface traversed previous to the action of the brush, a water tank 49 is provided with the valved outlet pipe 50 which at its lower end is provided with the sprinkler 51.

What I claim as new is:

1. In a street sweeper, a frame adapted to be swingingly connected to a wheeled vehicle, caster wheels for supporting the free end of the frame, a transversely disposed brush journaled in the frame and operably connected to the wheels of said vehicle, a trackway adapted to be carried by the vehicle body, a shaft mounted upon the trackway for sliding movement, a second shaft journaled in the frame, an endless conveyer operably connected to both of said shafts, and means for operably connecting one of said shafts to the brush.

2. In a street sweeper, a frame adapted to be swingingly connected to a wheeled vehicle, caster wheels for supporting the free end of the frame, a transversely disposed brush journaled in the frame and operably connected to the wheels of said vehicle, a trackway adapted to be carried by the vehicle body, a shaft mounted upon the trackway for sliding movement, a second shaft journaled in the frame, an endless conveyer operably connected to both of said shafts, means for operably connecting one of said shafts to the brush, a dirt guide shelf adjustably connected to the frame forwardly of the rotary brush, and rods adjustably swiveled at opposite sides of the vehicle body and having connection with the caster wheels and frame.

In testimony whereof I affix my signature.

CARL G. MILLER.

Copies of this patent may be obtained for five cents each, by addressing the "Commissioner of Patents, Washington, D. C."